April 19, 1949.   H. H. HITTSON   2,467,748
VIBRATORY MOTOR
Filed Jan. 8, 1946
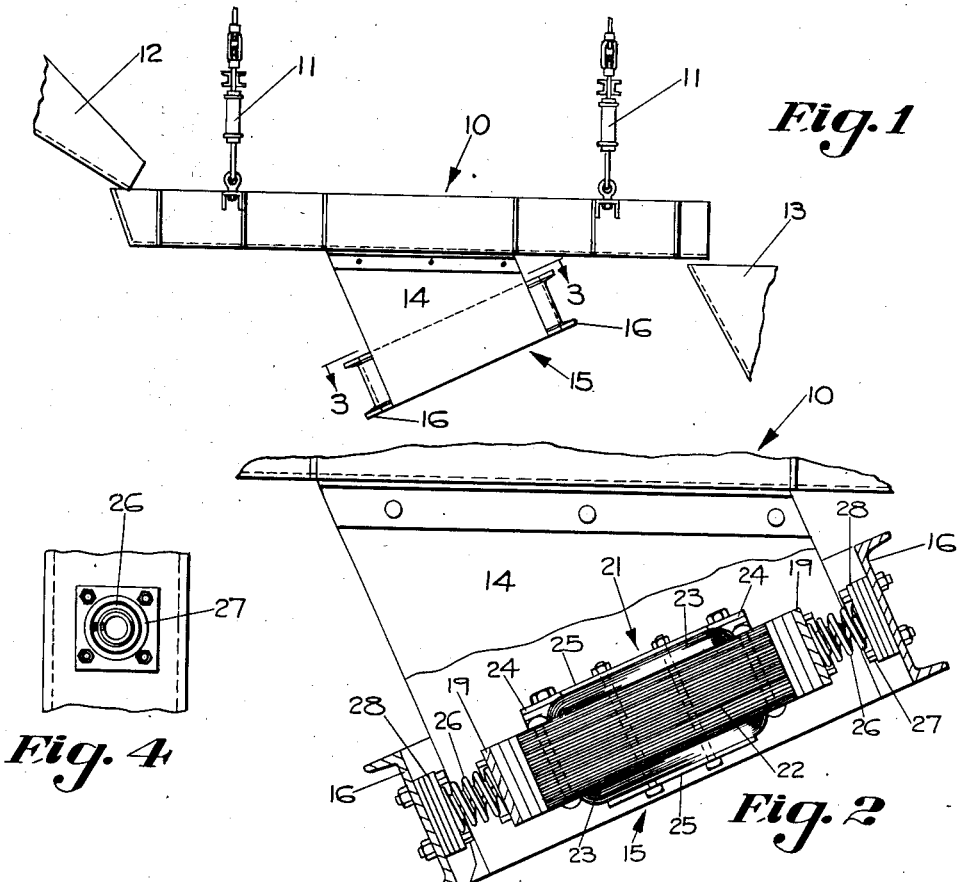
Fig. 1
Fig. 4
Fig. 2
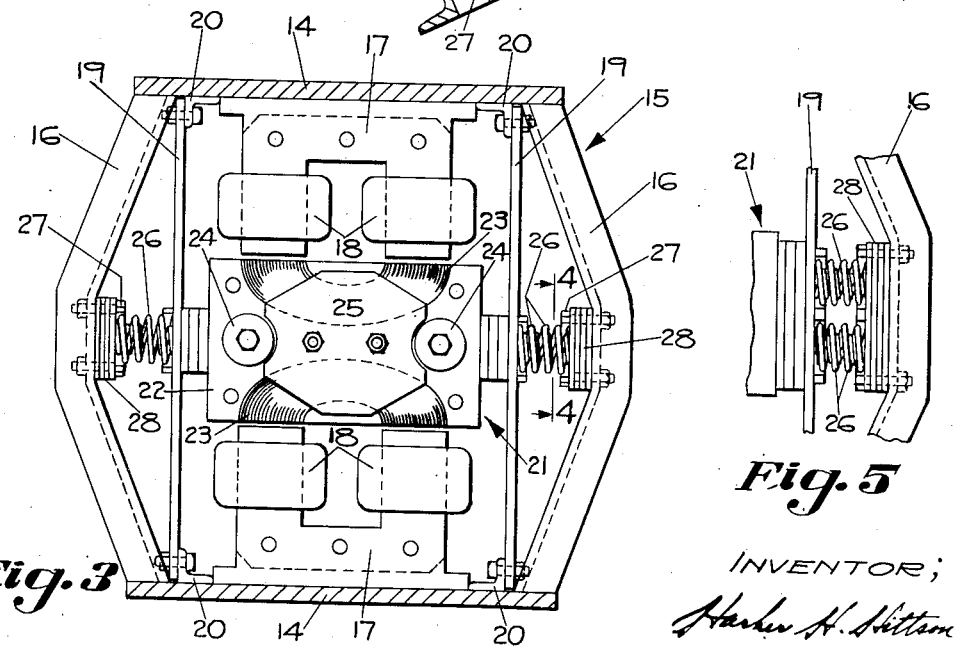
Fig. 3
Fig. 5
INVENTOR;
Harker H. Hittson Patented Apr. 19, 1949

2,467,748

UNITED STATES PATENT OFFICE 2,467,748

VIBRATORY MOTOR

Harker H. Hittson, Upper Arlington, Ohio, assignor, by mesne assignments, to The Jeffrey Company, a corporation of Ohio Application January 8, 1946, Serial No. 639,749

1 Claim. (Cl. 172—126)

This invention relates to a vibratory apparatus and to a vibratory electro-magnetic motor of improved construction.

An object of the invention is to provide improved apparatus of the above-mentioned type, and a more specific object of the invention is to provide an improved reaction type of electro-magnetic motor in which flat spring means or guide means are employed to interconnect the relatively vibrating masses and in which the principal restoring force or energy is supplied by one or more helical or coil springs.

Other objects of the invention will appear hereinafter, the novel features and combinations being set forth in the appended claim.

In the accompanying drawings,

Fig. 1 is a side view of a feeder or conveyor incorporating the structure of my invention;

Fig. 2 is an enlarged view, with parts in section, showing particularly the structure of a portion of the motor;

Fig. 3 is a sectional view taken on the line 3—3 of Fig. 1, looking in the direction of the arrows, with the principal motor parts shown in plan;

Fig. 4 is a sectional view taken on the line 4—4 of Fig. 3, looking in the direction of the arrows; and Fig. 5 is a plan view of a portion of a modified structure.

This invention constitutes an improvement on the invention of James Robert Lindsay for a Vibrating apparatus disclosed in application Serial No. 417,569, filed November 1, 1941, and embodies many of the principles and the structural features there disclosed, including employing the wiring circuit of said Lindsay device.

Referring particularly to Figs. 1 and 2 of the drawings, the device illustrated includes a feeder or conveyor deck 10 which is mounted for vibration by well known form of spring suspension devices 11, the deck 10 being fed by a chute 12 and delivering material to a hopper or other receptacle 13. Suspended or otherwise attached to the deck 10, as by a pair of spaced parallel upstanding and longitudinally extending side plates 14, is a vibratory electro-magnetic motor 15 of the reaction mass type, the rectilinear axis of vibration of which is in a plane which makes an acute angle, such as an angle of 30°, with the plane of the bottom of deck 10 so as to impart positive conveying action to granular material on said deck in a manner well understood in the art of vibratory feeders and conveyors. Deck 10 is thus the member or part of the unit which transmits vibratory forces to, or does work on, the material being conveyed or treated.

The vibratory motor 15 is preferably of the indefinite stroke type as this expression is explained in the above-mentioned Lindsay application, though in certain broader aspects of the invention it need not be. In a device of the reaction mass type the relative amplitude of vibration of the reaction mass, represented in this instance largely by the armature, with respect to the field structure, is relatively high. As a consequence of this fact, it is difficult to provide flat springs which have ample restoring force to produce the desired mechanical tuning so that the motor has a natural frequency equal to or close to that at which the motor vibrates as determined by the frequency or periodicity of the energizing electrical impulses, and still not cause high breakage of these flat bars due to the large amplitude of vibration of the motor.

Because of this undesirable characteristic of flat bars I propose to supply coil or helical springs which will be the principal source of energy or force to impart to the vibratory system the desired mechanical natural frequency of vibration. At the same time it is desirable to avoid all rubbing frictional contact in the motor and consequently I propose to employ some flat springs, principally to act as guide means to guide the vibratory armature relative to the field structure and prevent any frictional sliding contact between any of the relatively movable parts of the motor. The flat springs may have some restoring force so as to supplement the action of the coil springs, though in some instances they may be made extremely weak so that their function is largely that of guiding the armature or reaction mass.

In Figs. 2, 3 and 4 of the drawings I have illustrated one form of motor 15 having these desirable characteristics. That is, said motor 15 includes the bottom portions of the side plates 14 which form a portion of the main frame thereof, to the opposite ends of which are rigidly connected, as by welding, a pair of bowed channels 16.

Extending inwardly from each of the side plates 14 is a U-shaped field core 17, the two legs of which are provided with energizing field windings 18. On opposite sides of the field cores 17 there are flat leaf springs 19, the opposite ends of which are removably mounted on brackets 20, which brackets are welded to the plates 14.

At their centers, leaf springs 19 support the reaction mass represented largely by the armature 21, said armature 21 being attached at opposite ends through spacer blocks to the centers of said leaf springs 19. The armature 21 includes a laminated core 22 with a pair of spaced windings 23, the coil sides of which are received in grooves on the faces of said core 22. Adjustable weights in the form of removable washers 24 are provided on the top of the core 22 so as to adjust the weight of the armature 21. Top and bottom winding holding plates 25 are connected by through bolts and hold the windings 23 in place.

It is obvious that the spring bars or plates 19 hold the reaction mass or armature 21 in position with respect to the field cores 17 and are mounted for vibration with an indefinite stroke or, in other words, parallel to the pole faces of said cores 17 rather than toward and from said pole faces. This makes possible a very large stroke without appreciably varying the air gap and is particularly desirable in a reaction type motor because the amplitude of vibration of the mass 21 relative to the deck 10, etc., will be relatively large.

The relative amplitudes of vibration of the reaction mass 21 and the deck 10 with respect to a fixed point would be inversely proportional to their weights. In such a device the deck 10 and all parts of the motor 15 which are rigidly attached to it, such as field parts 17 and 18 and channels 16, constitute one mass, the armature 21 and all parts rigidly attached to it constituting the second or reaction mass. The reaction mass preferably has a weight less than one-half that of the deck or first mass and it may be considerably less, for example, as low as one-fifth or less.

Due to the high amplitude of vibration of the reaction mass 21 with respect to the main frame of the motor, there is necessarily considerable distortion of the spring bars 19. Where the restoring force which was necessary to produce the desired natural period of vibration of the vibratory system has been produced entirely by flat bars, it has been extremely difficult with high amplitude motors to provide flat bars which would not break. As a consequence, the principal mechanical restoring force, if not substantially all of it, in my device is supplied by coil springs.

As illustrated in Figs. 2, 3 and 4 of the drawings, there is a pair of nested coil or helical springs 26 provided adjacent the center of each spring 19 which is received in an adjustable cup 27 mounted at the center of each of the bowed channels 16. The static compression on the springs 26 may be adjusted by removing or inserting washers 28 which are placed between the base of the cup 27 and the adjacent channel 16 thus adjusting the natural period of vibration of the motor. Nuts and bolts extend through the base of the cup 27 and through the washers 28 so as to hold them removably in place.

In Fig. 5 of the drawings I have illustrated a modified form in which the restoring force is provided by two pairs of nested coil or helical springs adjacent each end of the armature 21, or, in other words, adjacent the center of each leaf spring 19 and associated bowed channel 16.

In operation, the field coils 18 may, for example, be energized by direct current, with the armature coils 23 connected in series or in parallel and energized from a source of alternating or pulsating current. Such energization will produce periodic vibratory motion of the armature 21 at a frequency twice that of the pulsating or undulating current in case it is alternating in character. If the pulsations are derived by rectifying alternating current or by mixed current, the frequency of vibration will be equal to the frequency of the source.

The mechanical system, involving the vibratory reaction mass 21, the deck or main frame mass, including deck 10 and the motor main frame as well as all parts rigidly attached thereto, will have a natural period of vibration substantially equal to the operating frequency of the motor, though preferably differing slightly therefrom for reasons well understood in the art.

The rectilinear vibration of the reaction mass 21 with respect to the deck, main frame or greater mass will be along a straight line which is along the axis of the coil or helical springs 26 or, in the case of the modification of Fig. 5, parallel therewith.

The principal mechanical force which tends to restore the normal position of the reaction mass 21 with respect to the field structure and main frame, as illustrated in Fig. 3, is preferably supplied by the helical springs 26 since due to their great effective length they can be compressed an appreciable amount without breaking them. Some of the restoring force is, however, preferably, though not necessarily, supplied by the leaf springs 19 which act as guides to maintain the armature 21 in proper position at all times and to prevent any rubbing frictional contact between it or any parts connected to it and the main frame of the motor or any parts connected to said main frame because any such frictional contact is extremely detrimental to the operation of the device, as it will modify the natural period of vibration thereof, as well as cause severe wearing due to the high frequency at which the device operates.

Obviously those skilled in the art may make various changes in the details and arrangement of parts without departing from the spirit and scope of the invention as defined by the claim hereto appended, and I therefore wish not to be restricted to the precise construction herein disclosed.

Having thus described and shown an embodiment of my invention, what I desire to secure by Letters Patent of the United States is:

A vibratory electromagnetic motor including a field structure providing a pole face, an armature, means mounting said armature for indefinite stroke vibration relative to said field structure with their relative movement being along an axis substantially parallel with the pole face of said field structure, said mounting means including a pair of elongated springs anchored at their ends to said field structure and at their centers to axially spaced portions of said armature, energy storing coil springs interconnecting said field structure and armature and adapted to be periodically compressed and expanded as said motor vibrates, and coil means for energizing said motor.

HARKER H. HITTSON.

REFERENCES CITED

The following references are of record in the file of this patent:

UNITED STATES PATENTS

| Number | Name | Date |
|---|---|---|
| 1,810,882 | Heymann | June 16, 1931 |
| 2,163,249 | Sherwen | June 20, 1939 |
| 2,180,189 | Alvord | Nov. 14, 1939 |
| 2,193,878 | Martin | Mar. 19, 1940 |
| 2,211,000 | Brown | Aug. 13, 1940 |
| 2,253,267 | Dietrich | Aug. 19, 1941 |
| 2,302,983 | Swallow | Nov. 24, 1942 |
| 2,380,622 | Weyandt | July 31, 1945 |
| 2,385,328 | Brown | Sept. 25, 1945 |

FOREIGN PATENTS

| Number | Country | Date |
|---|---|---|
| 625,492 | Germany | Feb. 10, 1936 |